Patented Oct. 14, 1941

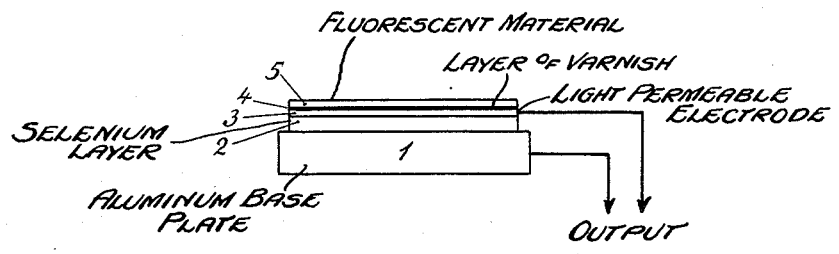
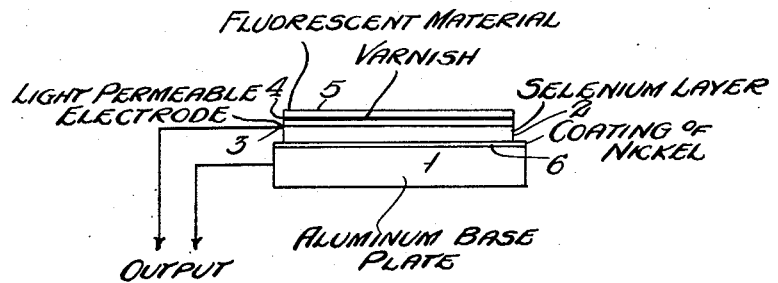

2,259,372

UNITED STATES PATENT OFFICE 2,259,372

LIGHT SENSITIVE DEVICE

Otmar Geisler, Nuremberg, Germany, assignor to Süddeutsche Apparatefabrik G. m. b. H., Nuremberg, Germany, a company Application June 16, 1938, Serial No. 214,167
In Germany June 30, 1937

2 Claims. (Cl. 136—89)

The present invention relates to light sensitive devices, and more specifically to improvements in photo-voltaic cells sensitive to X-rays and other short wave length radiations.

It is known that even X-rays and other radiations of still shorter wavelengths than rays within the visible spectrum can be rendered perceptible and be measured by means of the layer type of semi-conductor photo-voltaic cells, such as copper oxide cells, for example.

The rays of an X-ray bundle incident upon a photo-voltaic cell of the semi-conductor type will more or less penetrate such cell, and the degree of penetration depends upon the nature of the incident rays and also on the material or materials of which the photo-voltaic cell is composed. As compared with radiations of the visible spectrum, only a small portion of the X-rays will be absorbed in the light sensitive layer of the cell, from which follows, that rather few electrons will be released therein so that the current thus generated involves a correspondingly weak intensity, the indication of which requires metering instruments of utmost sensitiveness.

It is also known that the X-ray effect upon a semi-conductor blocking layer photo-voltaic device may be increased by directing the X-ray beam toward a fluorescent screen of any known fluorescent substance, such as barium-platinocyanide, calcium-tungstate or willemite. The visible rays as a result from the X-ray beam action upon the fluorescent screen are then absorbed by a semi-conductor photo-voltaic cell which transforms the fluorescent radiation into electromotive force.

Nevertheless, the expedient of interposing a fluorescent screen as mentioned heretofore is not well adapted to introduce any substantial gain with respect to the electromotive force desirable for measuring X-rays and other short wave length radiations, so that high-quality metering instruments are still required. Such highly sensitive instruments may be fairly well adapted for use in laboratories, but not for practical utilization, as for instance in the hands of a physician in cases that an intensity measurement of the X-rays is desirable during the course of a radiation treatment.

The present invention has for its object to so increase the sensitivenss of a semi-conductor photo-voltaic element to X-rays and other short wave length radiations and thereby so increase the resulting current that the intensity of the above mentioned radiation may be measured with electric metering instruments of lower sensitiveness and correspondingly of reduced expensiveness. It is a further object of the invention to provide an easy and compact one-unit photo-voltaic cell which is suitable for measurements heretofore referred to.

The invention will be more readily understood from the following description taken in conjunction with the accompanying drawing, wherein Figs. 1 and 2 illustrate photo-voltaic elements according to the invention.

Investigations have proven that selenium photo cells are particularly well adapted for use in the semi-conductor photo-voltaic device according to the invention since the base plate of this type of photo cells may be composed of a material which exerts a low effect of absorption upon X-rays. The base plate 1 of the element may preferably consist of aluminum which, if so desired, may be plated with a covering layer of nickel 6, as shown in Fig. 2, while it will be possible also to employ a plate of glass or any other suitable nonmetallic material which has been coated with a thin metallic layer. The selenium layer 2 is applied on said base plate 1 in any well known manner and then converted into its light sensitive and crystalline structure in a thermic formation process. This formation product is covered in accordance with any known method by a light permeable counter electrode 3 which is provided with a ring or grid (not shown) applied by sputtering and serving as connector to the electrode lead. The light permeable electrode of the so prepared photo-voltaic cell is provided according to one feature of the invention with a film 4 of protective varnish which is caused to stiffen, whereupon a layer 5 of any known fluorescent substance capable of being excited by the radiation to be measured is attached to said film 4 of varnish. The intermediate film 4 can be omitted since the fluorescent layer 5 may also be directly applied to the light permeable electrode 3 without detrimentally influencing the effect of the cell.

A photo-voltaic cell designed according to the invention as above disclosed may be so positioned relative to the source of radiation that either its fluorescent layer or its base plate faces this source. A radiation directed toward the fluorescent layer is particularly advantageous in cases that ultra violet rays or X-rays shall be measured, provided that a possibly low absorption of these rays is desired, while a radiation directed against the base plate of the cell enables certain ranges of the incident rays to be filtered out by suitable choice of material and thickness of the base plate. The rays passing through such a base plate penetrate the layer of selenium and the light permeable counter electrode where merely a low degree of absorption takes place, and impinge upon the fluorescent layer which is rendered luminous. The visible rays diffused from the fluorescent layer, in turn penetrate through the light permeable covering electrode into the semi-conductor where electrons are released. The resulting current is then derived between a suitable lead attached to the base plate and a second lead connected to the heretofore mentioned ring of the covering electrode. On the other hand, if the photo cell according to the invention is subjected to radiation which is incident upon the fluorescent layer thereof, the radiation remains unfiltered before the cell involves its photo-electric effect. Also in this case the fluorescent screen or layer becomes luminous by virtue of the incident rays and the diffusive radiation of visible rays from this layer makes the photo-voltaic cell operative.

The application of the fluorescent layer either directly on the light permeable electrode of a semi-conductor type of photo-voltaic cells or by means of an intermediate film of varnish considerably improves the transformation of the X-ray energy into an electric energy, and this improvement involves the possibility of obtaining accurate measurements even with instruments with lower sensitiveness than those employed in connection with heretofore known methods of such measurements. Moreover, the omission of a separate fluorescent screen renders the photo cell easier to handle and more compact.

Still a further improvement may be obtained if a number of photo cells according to the invention is placed one upon the other. This may be accomplished in such manner that two cells or two and two cells are assembled to one unit with their fluorescent layers facing each other, in which case the fluorescent layer may serve as a binding agent between the two cells forming such unit. On the other hand, the fluorescent layer of one cell may also face the base plate of another cell. The two leads of each individual cell must be extended to the exterior of the unit in any suitable manner where they are connected either in series or in parallel relation. The X-rays which completely have penetrated one cell render the fluorescent layer of the succeeding cell luminous with the result that the photo-voltaic cell element generates a photo-electric current, the gain of which is considerably increased by the aforesaid combination of photo-voltaic elements. Two or more photo-voltaic cell units heretofore mentioned may be assembled to a light sensitive device in accordance with the objects which are to be fulfilled by such combinations.

The invention is by no means restricted to selenium photo-voltaic cells having a fluorescent layer attached thereto, since any kind of semi-conductor photo-voltaic cells of the layer type may be treated in the same manner as heretofore disclosed.

What is claimed is:

1. A light sensitive unit comprising in superposed sequence a supporting base plate of aluminum which exerts a selective filtering action on X-rays, a photoactive selenium layer, a transparent electrode, and a fluorescent layer, the unit being adapted for photo-voltaic generation when energized by X-rays entering the unit through the fluorescent layer or through the base.

2. An X-ray sensitive unit comprising in superposed sequence a supporting base plate of aluminum, a coating of nickel plated thereon, a photoactive layer of light sensitive selenium coated on said nickel, a light permeable counter electrode coated upon said selenium layer, an insulating film coated upon said light permeable counter electrode, and a fluorescent layer coated upon said insulating film.

OTMAR GEISLER.